though dissolution of the copal resin may also take place at room temperature, it is not desirable to do so because it slows down the process.

2,753,331

PROCESS FOR THE PREPARATION OF COPALS FOR USE IN THE PRODUCTION OF LACQUERS AND VARNISHES

Louis Lacroix, Brussels, Belgium, assignor to Gino Vuagnat, Geneva, Switzerland

No Drawing. Application December 3, 1954, Serial No. 473,054

Claims priority, application Belgium December 5, 1953

8 Claims. (Cl. 260—107)

This invention relates to a process for the preparation of copals for industrial purposes, and more particularly to a process for the preparation of copals adapted for use in the manufacture of lacquers, varnishes, synthetic compositions and the like.

The procedure commonly used in industry to prepare natural copal resins for incorporation into lacquers and varnishes consists primarily of roasting or "running" the natural product in suitable vessels at elevated temperatures.

It is further known that there are natural copal resins which have different physical and chemical properties which manifest themselves particularly in the form of the capability of such resins to resist polymerization. Thus, it has been found that copals in their natural state can be divided into two distinct groups, namely stable and unstable copals. Only the stable copals can be subjected to the running treatment without any danger of ignition or frothing. Unstable copals, however, can not safely be roasted by the methods known to the art, and the lacquer and varnish industry is therefore dependent upon the supply of stable copals.

Moreover, the known methods for running copals are not only unreliable as to the uniform quality of the product produced thereby but also very expensive.

It is therefore an object of the present invention to provide a process for the preparation of natural copal resins, for their inclusion into lacquers, varnishes and the like which can be applied to all natural copal resins, regardless of whether they are stable or unstable.

Another object of the present invention is to provide a process for the preparation of natural copal resins for their inclusion into lacquers, varnishes and the like, which can be carried safely with all types of natural copal resins, regardless of whether they are of the stable or unstable type.

Still another object of the present invention is to provide a process for the preparation of natural copal resins for their inclusion into lacquers, varnishes and the like, which is relatively inexpensive and assures a uniform quality of the product produced thereby.

Other objects and advantages will become apparent as the description of the process in accordance with the present invention proceeds.

I have found that these and other objects can be achieved by a procedure which, in general, comprises dissolving the raw natural copal resin, regardless of whether it contains unstable or stable copals, in a suitable solvent, treating the resulting solution with a reducing agent, filtering the reduced solution, and finally removing the solvent by distillation.

With the aid of this process it is possible to prepare safely, not only the so-called mediocre copals as well as ordinary copals, but also copal waste, dust, etc., regardless of whether such copals are unstable or stable. Moreover, the process can be carried to completion within a relatively short period of time. It is evident, therefore, that the process in accordance with my invention represents a considerable improvement over the processes known in the art.

In practicing the process in accordance with my invention it is preferred that the raw natural copal resin is dissolved in the solvent at a temperature not higher than 100° C. Thus, it is advantageous to use solvents or mixtures of solvents whose boiling point is no higher than 100° C. However, it is also possible to employ a solvent mixture some individual components of which have a boiling point higher than 100° C., provided that the boiling point of the mixture as a whole does not exceed 100° C.

The boiling point of the solvent, however, may also be higher than the temperature at which the copal resin is dissolved. For example, if a mixture of hydrocarbons is used as a solvent, and the boiling point of that mixture is about 100° C., it is advantageous to dissolve the copal at a temperature lower than the boiling point of the solvent.

Examples of particular solvents or solvent mixtures which are suitable for use in the process of my invention are tertiary butyl alcohol, secondary butyl alcohol, n-butyl alcohol, or mixtures of an aliphatic or an aromatic alcohol with any of the above-mentioned alcohols, provided that such mixtures have a boiling point not higher than 100° C.

In order to hasten and facilitate the dissolution of the natural copal resin in the hot solvent it is advantageous to comminute the copal resin by crushing or grinding prior to its dissolution in the solvent.

To reduce the dissolved copal resin, a reducing agent such as, for example, hydrogen, aldehydes such as formaldehyde, and similar compounds can be used.

A further embodiment and variation of the process in accordance with my invention comprises subjecting the dissolved copal resin to an oxidation treatment with a suitable oxidizing agent prior to the reducing step. Moreover, the reduced product may also be treated with salts of mineral acids or lower aliphatic fatty acids prior to the distillation step.

In certain instances, depending upon the ultimate use of the refined copal, the reaction product may also be washed with water in order to remove substances therefrom which constitute undesirable impurities in the ultimate end product, such as in the lacquer or varnish prepared with the copal resin refined in accordance with my invention.

I have further found that a particularly good refined copal is obtained when the oxidation step is carried out in the presence of a compound which is capable of promoting the oxidation process. Such compounds include alkalis, acids, and inorganic and organic salts. Examples of suitable alkaline compounds are sodium hydroxide, sodium carbonate, potassium carbonate, ammonia, and triethylamine. Suitable acid compounds are, for example, sulfuric acid, hydrochloric acid, acetic acid, phosphoric acid, oxalic acid and formic acid. Salts which may be used for this purpose are, for example, sodium sulfate, sodium phosphate, sodium chloride, sodium acetate, potassium acetate, sodium hydroplumbite and lead acetate.

It is not essential that the raw copal resin be dissolved in the solvent or solvent mixture before the oxidizing agent and the oxidation-promoting compound are added to the solution. Thus, for example, equally good results are obtained by adding the comminuted raw copal resin to the solvent which has the oxidation-promoting compound already dissolved therein, heating this mixture and then adding the oxidizing agent, or, in the alternative, by first admixing the solvent with the oxidizing agent and the oxidation-promoting agent, then slowly adding the comminuted raw copal resin and finally heating the resulting mixture. In all cases, however, the dissolution of the copal resin and its oxidation must take place at an elevated temperature not exceeding 100° C.

The process in accordance with my invention prevents the degradation as well as the polymerization of certain natural constituents of the raw copal resin.

The following examples will further illustrate my invention and enable others skilled in the art to understand the invention more completely. It is understood, however, that there is no intent to limit the invention to the scope of these examples.

Example I 100 kg. raw copal resin were dissolved in 300 kg. of a solvent mixture, consisting of 80% by weight benzene and 20% by weight isobutyl alcohol, at a temperature of about 90° C. To the hot solution, about 10% oxygen was added in the form of 100% hydrogen peroxide over a period of 6-14 hours. Thereafter, the oxidized mixture was reduced by adding 10% formaldehyde thereto, and the reduced mixture was distilled to remove the solvent. The resulting refined copal lends itself excellently for the production of lacquers, varnishes and the like.

Example II 100 kg. raw copal resin were dissolved in 300 kg. of a solvent mixture, consisting of 80% by weight benzene and 20% by weight isobutyl alcohol, at about 90° C. Thereafter, 2% borax were added to the solution as an oxidation-promoting compound, and finally 100% hydrogen peroxide was added over a period of 5 to 14 hours until the amount of available oxygen was about 10% based upon the weight of raw copal resin. Subsequently, the oxidized solution was reduced with formaldehyde and distilled as in Example I. The resulting refined copal was also excellently suited for the production of lacquers and varnishes.

While I have disclosed certain specific embodiments of my invention, I wish it to be understood that various changes and modifications can be made therein without departing from the spirit of the invention or from the scope of the following claims.

I claim:

1. The method of refining a raw natural copal resin, which comprises the steps of dissolving said resin at an elevated temperature not higher than 100° C. in an organic solvent medium selected from the group consisting of butyl alcohols and mixtures of butyl alcohols with benzene, said solvent medium having a boiling point of about 100° C., reducing the hot solution with a reducing agent selected from the group consisting of hydrogen and formaldehyde, filtering the reduced solution, and removing the solvent medium by distillation.

2. The method of refining a raw natural copal resin, which comprises the steps of dissolving said resin at an elevated temperatre not higher than 100° C. in a solvent mixture of isobutyl alcohol and benzene, said mixture having a boiling point of about 100° C., reducing the hot solution with formaldehyde, filtering the reduced solution, and removing the solvent mixture by distillation.

3. The method of refining a raw natural copal resin, which comprises the steps of dissolving said resin at an elevated temperature not higher than 100° C. in a solvent mixture containing 80% by weight benzene and 20% by weight isobutyl alcohol, reducing the hot solution with formaldehyde, filtering the reduced solution, and removing the solvent mixture by distillation.

4. The method of refining a raw natural copal resin, which comprises the steps of dissolving said resin at elevated temperatures not higher than 100° C. in an organic solvent medium selected from the group consisting of butyl alcohols and mixtures of butyl alcohols with benzene, said solvent medium having a boiling point of about 100° C., reducing the hot solution with a reducing agent selected from the group consisting of hydrogen and formaldehyde, filtering the reduced solution, acidifying the filtrate, and separating the refined copal from the acidified filtrate by distillation.

5. The method of refining a raw natural copal resin, which comprises the steps of dissolving said resin at elevated temperatures not higher than 100° C. in an organic solvent medium selected from the group consisting of butyl alcohols and mixtures of butyl alcohols with benzene, said solvent medium having a boiling point of about 100° C., reducing the hot solution with a reducing agent selected from the group consisting of hydrogen and formaldehyde, filtering the reduced solution, washing the reduced product with water, and separating the refined copal by distillation.

6. The method of refining a raw natural copal resin, which comprises dissolving said resin at elevated temperatures not higher than 100° C. in an organic solvent medium selected from the group consisting of butyl alcohols and mixtures of butyl alcohols with benzene, said solvent medium having a boiling point of about 100° C., oxidizing the solution with an inorganic peroxide, reducing the hot oxidized solution with a reducing agent selected from the group consisting of hydrogen and formaldehyde, filtering the reduced solution, and separating the refined copal by distillation.

7. The method of refining a raw natural copal resin, which comprises dissolving said resin at elevated temperatures not higher than 100° C. in an organic solvent medium selected from the group consisting of butyl alcohols and mixtures of butyl alcohols and benzene, said solvent medium having a boiling point of about 100° C., oxidizing the hot solution with hydrogen peroxide, reducing the hot oxidized solution with formaldehyde, filtering the reduced solution, and separating the refined copal by distillation.

8. The method of refining a raw natural copal resin, which comprises dissolving said resin at elevated temperatures not higher than 100° C. in an organic solvent medium selected from the group consisting of butyl alcohols and mixtures of butyl alcohols and benzene, said solvent medium having a boiling point of about 100° C., oxidizing the hot solution with an inorganic peroxide in the presence of borax as an oxidation-promoting compound, reducing the hot oxidized solution with a reducing agent selected from the group consisting of hydrogen and formaldehyde, filtering the reduced solution, and separating the refined copal by distillation.

No references cited.